(12) United States Patent
Pierre et al.

(10) Patent No.: US 9,879,149 B2
(45) Date of Patent: Jan. 30, 2018

(54) ORGANIC RESIN BEARING CYCLIC CARBONATE GROUPS AND AQUEOUS DISPERSION FOR CROSSLINKED POLYURETHANES

(71) Applicant: Arkema France, Colombes (FR)

(72) Inventors: Aurelie Pierre, Paris (FR); Gregory A. Delmas, Senlis (FR); Frank Cogordan, Paris (FR); Isabelle Betremieux, Coye la Foret (FR)

(73) Assignee: Arkema France, Colombes (FR)

( * ) Notice: Subject to any disclaimer, the term of this patent is extended or adjusted under 35 U.S.C. 154(b) by 0 days.

(21) Appl. No.: 14/652,490

(22) PCT Filed: Dec. 18, 2013

(86) PCT No.: PCT/FR2013/053154
§ 371 (c)(1),
(2) Date: Jun. 16, 2015

(87) PCT Pub. No.: WO2014/096696
PCT Pub. Date: Jun. 26, 2014

(65) Prior Publication Data
US 2015/0329733 A1    Nov. 19, 2015

(30) Foreign Application Priority Data

Dec. 19, 2012 (FR) ...................... 12 62301

(51) Int. Cl.
| | | |
|---|---|---|
| C08G 71/04 | (2006.01) | |
| C09D 125/14 | (2006.01) | |
| C08J 3/07 | (2006.01) | |
| C09D 133/14 | (2006.01) | |
| C08L 33/14 | (2006.01) | |
| C08F 220/28 | (2006.01) | |

(52) U.S. Cl.
CPC ............ C09D 125/14 (2013.01); C08G 71/04 (2013.01); C08J 3/07 (2013.01); C08L 33/14 (2013.01); C09D 133/14 (2013.01); *C08F 2220/283* (2013.01)

(58) Field of Classification Search
CPC .... C09D 125/14; C09D 133/14; C08G 71/04; C08J 3/07; C08L 33/14
USPC .......................................... 526/269; 523/328
See application file for complete search history.

(56) References Cited

U.S. PATENT DOCUMENTS

| | | | | |
|---|---|---|---|---|
| 4,882,391 | A * | 11/1989 | Brindopke | ................ C08F 8/32 525/327.2 |
| 5,045,602 | A * | 9/1991 | Wamprecht | ............. C08L 79/02 525/207 |
| 2012/0251730 | A1 | 10/2012 | Brym et al. | |
| 2012/0316286 | A1 | 12/2012 | Mecfel-Marczewski et al. | |

FOREIGN PATENT DOCUMENTS

| | | |
|---|---|---|
| BE | 1009543 A | 5/1997 |
| EP | 0 337 926 B1 | 1/1997 |
| WO | WO 97/23516 | 7/1997 |
| WO | WO 2011/035982 A1 | 3/2011 |

* cited by examiner

*Primary Examiner* — Edward Cain
(74) *Attorney, Agent, or Firm* — Lynn B. Morreale

(57) ABSTRACT

Firstly, the invention concerns an organic resin that comprises structural units in its overall composition obtained from:
a) at least one ethylenically unsaturated monomer carrying a cyclic carbonate group,
b) at least one ethylenically unsaturated monomer carrying at least one carboxylic acid group,
c) at least one ethylenically unsaturated monomer with a hydrophobic nature having a hydrophobic value, estimated by the logarithm of the partition coefficient between octanol and water, of at least 3,
d) optionally, at least one other ethylenically unsaturated monomer that is different from said monomers a), b) or c) and does not carry any group that is susceptible of reacting with a carbonate group or carboxylic acid group, but also no group that is susceptible of reacting with a functional group of another monomeric component of said resin, all cross-linking reactions in the preparation of said resin being excluded,
overall, said resin having:
an acid value of at least 10 mg KOH/g with respect to the dry resin, and
a cyclic carbonate group content of 0.5 to 3.5 mmol/g with respect to the dry resin.

The invention also concerns an aqueous dispersion of said resin and a preparation process as a cross-linkable aqueous composition comprising said resin or dispersion and a polyamine. The resin is used for the preparation of cross-linked polyurethanes without the use of polyisocyanate, in particular in high performance aqueous coatings.

24 Claims, No Drawings

ORGANIC RESIN BEARING CYCLIC CARBONATE GROUPS AND AQUEOUS DISPERSION FOR CROSSLINKED POLYURETHANES

CROSS-REFERENCE TO RELATED APPLICATIONS

This application is a national stage application under 35 U.S.C. § 371 of PCT/FR2013/053154, filed Dec. 18, 2013, which claims benefit to French patent application FR 12/62301, filed Dec. 19, 2012.

FIELD OF THE INVENTION

The present invention relates to a specific resin, in particular acrylic, vinyl or acrylic-vinyl, carrying cyclic carbonate groups and carboxylic groups, this resin being capable of forming an aqueous dispersion without surfactant, an aqueous dispersion comprising it, a process for preparing this aqueous dispersion and aqueous cross-linkable compositions, in particular coatings, comprising said resin or aqueous dispersion for the preparation of cross-linked polyurethanes without using any isocyanate.

More particularly, the present invention relates to obtaining cross-linked polyurethanes (PU) starting from a two-component reactant system, one being the resin with cyclic carbonate functions of the invention in dispersion in an aqueous medium, and the other being a cross-linking agent selected from polyamines carrying primary and/or secondary amine groups, this being without the need for isocyanates which are generally associated with polyols in order to obtain polyurethanes in the usual manner.

BACKGROUND OF THE INVENTION

Obtaining cross-linked polyurethanes from a two-component system in an organic solvent medium or in an aqueous medium in dispersion, starting from a polyol resin by reaction with a polyisocyanate, is already well known. More particularly, acrylic polyols are known for coating applications because of their better performances, in particular as regards ageing. Such polyols are copolymers of a blend of acrylic monomers comprising a hydroxyalkyl (meth)acrylate, such as hydroxyethyl (meth)acrylate (HE(M)A), or hydroxypropyl (meth)acrylate or hydroxybutyl (meth)acrylate.

The essential disadvantage of such prior art systems is linked to the fact that an isocyanate (polyisocyanate) is indispensable as a cross-linking agent for such cross-linked two-component polyurethane systems based on acrylic-polyol resins. In fact, such use gives rise to problems with toxicity, safety and noxiousness to human health and to the environment in general; these problems impose severe restrictions as regards their handling, even in aqueous media, and so handling becomes ever more complex and expensive. Because of their toxicity and their preparation from starting materials which are also toxic and noxious to the environment, such as phosgene with the emission of hydrochloric acid, which is also noxious to the environment, chemistry of this type, based on the use of isocyanates, needs to be replaced with solutions which are more environmentally and human-friendly and which respect the environment and human health, such as sustainable development using new starting materials which allow this.

Furthermore, in addition to health and environmental problems, using a cross-linkable polyol-isocyanate system is extremely sensitive to the conditions of application, i.e. whether a solvent or an aqueous medium (even higher isocyanate consumption) is used, with consumption of some of the isocyanate functions by the residual water in a solvent medium or by the water in an aqueous medium with a stoichiometry which is difficult to control, with consequences for the reproducibility of the final performance resulting in an over-consumption of isocyanate compared with the necessary stoichiometry. The consumption of isocyanate in the system by ambient moisture or by water in an aqueous medium with secondary reactions (decarboxylation and formation of polyamines transformed into polyureas) may affect the structure and final performances of the coating. In particular, the release of $CO_2$ by reaction with water leads to the formation of bubbles of $CO_2$ (defects) in the final coating, in particular in the case of thick coatings. This is a major limitation to the conventional polyol-isocyanate system in terms of the possible maximum dry thickness without said defect ($CO_2$ bubbles) for a conventional PU coating. This maximum dry thickness performance without said defect is known as the "pinhole limit" measured by the pinhole limit test as defined in the experimental section. In coating systems based on conventional PU (isocyanate-based), this maximum thickness is 70 μm at best. In the coatings of the invention, these defects are not present, and thus there is no limit. The other disadvantage of isocyanates in these coatings is their high impact on the cost price, accentuated in particular by the over-consumption of isocyanate by the secondary reaction with water. Novel two-component systems are already known in the art that do not use a polyisocyanate (known as NIPU: non-isocyanate PU) for replacing PU systems based on polyol-polyisocyanate. They are based on resins carrying cyclic carbonate groups that can be cross-linked by a polyamine.

More particularly, BE 1009543 describes a system based on carbonate-functionalized acrylic resin obtained by solution polymerization cross-linked with a primary polyamine for clear coat applications in a solvent-based medium.

US 2012/0251730 describes a two-component solvent-based composition that is capable of drying without using polyisocyanates or without melamine-formaldehyde resins as cross-linking agents. It is constituted by a copolymer obtained by radical polymerization and containing at least one cyclic carbonate group, a polyamine containing at least two primary and secondary amine groups, optionally at least one solvent, pigment and additive. The examples show a film with an interesting hardness, but not the production of compositions with a low VOC level (VOC: volatile organic compounds).

WO 2011/035982 describes a system based on acrylic resins that can be dispersed in water with a carbonate functionality for cross-linking with polyamines, the synthesis being carried out in a solvent medium. Dispersibility in water is only obtained using a polymerizable surfactant.

US 2012/316286 describes a similar hydrodispersible binder based on a vinyl copolymer obtained from a cyclic carbonate-functionalized monomer, a monomeric emulsifying agent and another co-monomer which can be used to obtain aqueous dispersions.

Although a system as described in the documents cited from the prior art can primarily be used to obtain polyurethanes (PU) without making use of a polyisocyanate, several supplemental problems have to be overcome in addition to those cited above. In particular, in a solvent medium, an acrylic resin carrying cyclic carbonate functions has a much higher viscosity than an equivalent hydroxylated resin for the same quantity by weight of monomer carrying the corresponding function, which means that the viscosity is significantly higher for the same molar quantity (or same index, expressed in equivalent mg KOH/g). This has the result of limiting the dry extract content (or solids extract) in the cross-linkable composition, this being in order to be able to keep the viscosity constant and appropriate, which is an essential parameter for applications with coatings in a solvent medium. In a solvent-based medium, introducing carbonate functions increases the viscosity, which makes the development of resins with a high dry extract and thus a low VOC level difficult. Emulsification in the form of an aqueous dispersion is a solution to this problem.

At a time when regulations regarding reducing the VOC are becoming stricter, satisfactory solutions to this problem are not known in the art. Thus, there is a need for novel resins, in particular acrylic resins, with carbonate functionalities that are capable of forming stable aqueous dispersions and that can be used for the formulation of aqueous coatings and in particular paints, varnishes, inks, adhesives, glues, sealants with a low VOC level and with an aqueous dispersion obtained thereby which is adapted to applications in coatings in aqueous media.

DETAILED DESCRIPTION OF CERTAIN EMBODIMENTS OF THE INVENTION

Thus, the problem initially consists of discovering a resin specifically selected not to need the use of isocyanates, carrying cyclic carbonate groups with a high solids content in an organic solvent medium, which is capable of forming a stable aqueous dispersion for use in a specific two-component system, which can be cross-linked at a relatively low temperature from ambient temperature (20-25° C.) to 150° C., with a polyamine as the cross-linking agent and with a low VOC level and a dry extract (solids content) from 30% to 60% and without affecting applications as cross-linkable coatings in aqueous media. This specific envisaged system must be a novel two-component polyurethane system which can be cross-linked without using any isocyanate and, for this reason and because of the need to reduce the VOC level, it has to be environmentally friendly and health friendly, and in particular it must not be sensitive to water, the performances of the polyurethane coatings obtained thereby must not be significantly affected by this novel system or must have similar if not identical performances to those of a comparable polyol-polyisocyanate system of the prior art.

More particularly, by particular selection of the composition of the monomers and the specific structure of said resin, the present invention can be used to obtain a high solids content in solution in organic media for the resin obtained compared with a standard prior art polyol resin, and a good capability of forming stable aqueous dispersions which can be used in cross-linkable two-component aqueous systems.

Thus, the cross-linkable system of the invention envisages a low VOC level and a high dry extract (or solids content) without affecting the coating application conditions (viscosity unaffected, despite a high solids content).

Some principal advantages linked to the novel system of the present invention that may be cited are as follows:
  obtaining PU coatings with properties inherent to this type of coating, without using isocyanates, in particular obtaining thick coatings without defects linked to this use and with improved hygiene and safety conditions and respecting the environment and at least with no (significant) effect on the essential performances of said coating or maintaining similar if not identical performances to those of a comparable prior art polyol-polyisocyanate system,
  cross-linking at a relatively low temperature, in particular in a range from ambient temperature to 150° C., possibly with the aid of a suitable catalyst,
  formulating coatings, in particular paints, varnishes, inks, adhesives, glues, sealants with high dry extracts (solids content), complying with the trends in regulations in force regarding VOCs,
  the possibility of associating a second reactive cross-linking agent with the hydroxyl functions generated in the β-position during the cross-linking reaction between the amine functions of a polyamine and the carbonate cycles (by opening) carried by said resin of the invention, and also of increasing the cross-linking density with a hybrid system, for example by reaction with supplemental anhydride or block silane or melamine or other cross-linking agents,
  the possibility of using polyamines of bioresource origin as cross-linking agents, such as dimeric diamines based on fatty amines of renewable origin, and thus of increasing the degree (quantity) of renewable carbon in the formulation with a possibility of improving the life cycle of the product,
  the possibility of using, as a diluent for the resin during dispersion thereof, a diluent that reacts with the polyamine cross-linking agent that can thus be used to adjust the dilution of the resin, a higher final solids content (very low VOC level) and a larger cross-linking density with a multi-functional reactive diluent, with the possible provision of supplemental specific properties by these reactive diluents,
  reducing the overall cost of the formulation compared with a polyol-isocyanate system,
  rapid drying and maintenance of good properties for the coating film obtained, despite the low VOC level,
  good application performances, in particular in terms of durability, as well as in terms of corrosion, hardness/flexibility compromise, adhesion to substrate, chemical resistance and thermal behavior.

The term "low VOC level" as used in the present invention means a level of less than 250 g/L, preferably less than 200 g/L of volatile organic compounds, in particular with a boiling point (Tb) of less than 250° C. at atmospheric pressure.

In a first aspect, the present invention thus provides a specific resin carrying carbonate functions and carboxylic functions with specific indices (levels) of carbonate and acid.

The second aspect of the invention concerns an aqueous dispersion comprising said resin in accordance with the invention, in particular with no surfactant.

The third aspect of the invention concerns a process for the preparation of said aqueous dispersion.

In another aspect, the invention concerns a cross-linkable aqueous composition of organic binder comprising said resin or said aqueous dispersion, and more particularly additionally comprising at least one cross-linking agent selected from polyamines with a functionality of at least 2. More particularly, this composition is a coating composition.

The invention also encompasses the use of said resin of the invention in the preparation of cross-linked polyurethanes starting from cross-linkable aqueous compositions as defined in the invention.

Finally, a cross-linked polyurethane which results from cross-linking said resin with a polyamine with a functionality of at least 2 or a cross-linkable composition as defined in the invention also forms part of the invention.

Thus, the first aspect of the present invention concerns an organic resin that is soluble in organic media, which means that it has a linear or branched structure, which comprises structural units in its overall composition obtained from:
  a) at least one ethylenically unsaturated monomer carrying a cyclic carbonate group, preferably selected from vinyl carbonates or ethylenically unsaturated esters carrying a cyclic carbonate group,
  b) at least one ethylenically unsaturated monomer carrying at least one carboxylic acid group,
  c) at least one ethylenically unsaturated monomer with a hydrophobic nature having a hydrophobic value, estimated by the logarithm of the partition coefficient between octanol and water (Kow), in particular a value estimated using log Kow with the estimation method (Estimation Program Interface Suite®, KowWin) from Syracuse Research Corporation (SRC), of at least 3, preferably at least 3.5, more preferably at least 4 and still more preferably at least 4.5,
  d) optionally, at least one other ethylenically unsaturated monomer that is different from said monomers a), b) or c) and does not carry any group that is susceptible of reacting with a carbonate group or carboxylic acid group, but also no group that is susceptible of reacting with a functional group of another monomeric component of said resin, all cross-linking reactions in the preparation of said resin being excluded,
overall, said resin having:
  an acid value of at least 10, preferably 15 to 50, more preferably 15 to 40 mg KOH/g with respect to the dry resin, and
  a cyclic carbonate group content of 0.5 to 3.5 mmol/g, preferably 0.9 to 3 mmol/g, more preferably 1.5 to 2.5 mmol/g with respect to the dry resin,
and preferably said resin having an overall hydrophobic value, based on the logarithm of the partition coefficient between octanol and water, in particular estimated by the weighted average of log Kow over the entirety of the monomeric constituents using the KowWin method, of at least 1.5, preferably at least 1.6.

In general, a "hydrophobic" monomer is a monomer having little affinity with water or which has poor solubility in water. A method for estimating this hydrophobicity is that of measuring the partition coefficient of the substance to be evaluated between octanol and water, with the hydrophobicity expressed as the logarithm of this partition coefficient. The hydrophobic value log Kow for a monomer is an estimation calculated from the logarithm of the partition coefficient (log P) between octanol and water, using for this estimate the method involving the contribution from atoms and structural fragments of the molecule, using the EPI (Estimation Program Interface) Suite® software (estimation program) known as KowWin from SRC (Syracuse Research Corporation). The epi 4.11 method and program used for this calculation (estimation) of log Kow for monomers are available from the address http://www.epa.gov/oppt/exposure/pubs/episuite.htm. This methodology was described by W. M. Meylan and P. H. Howard in 1995 in "Atom/fragment contribution method for estimating octanol-water partition coefficients" in Pharm. Sci. 84:83-92. The partition coefficient P corresponds to the ratio of the chemical concentration in the octanol phase to the chemical concentration in the aqueous phase in a system with two phases in equilibrium. Concerning a copolymer, in particular like a resin as defined in the invention, the overall hydrophobic value of the invention, based on the logarithm of the octanol/water partition coefficient, is defined as being the mean weighted value over all of the monomers composing the resin and it is in particular estimated by the weighted average, over all of the monomeric components of the resin, of the individual log Kow values calculated by the KowWin method as described above; thus, in accordance with this definition, it corresponds to:

overall hydrophobic value: $\Sigma_1[x_i^*(\log Kow)_i]$ where
$\Sigma_1$: sum over i monomeric components
$x_i$: fraction by weight of monomer i in said copolymer,
$(\log Kow)_i$: hydrophobic value calculated using the KowWin method for said monomer i, with Kow corresponding to the calculated octanol/water partition coefficient and log Kow being the logarithm of this coefficient.

The term used above, "resin soluble in an organic medium" in fact means that said resin does not have any cross-linked structure, in which case (if it were cross-linked), it would be insoluble in any solvent (organic medium). More precisely, the fact that said resin is soluble means that it has a linear or branched structure, and thus it is soluble in at least one solvent, and thus said resin cannot have a cross-linked structure (excluded).

In accordance with a preferred option, said monomer c) comprises at least one linear or branched aliphatic group containing at least 6, preferably at least 12 carbon atoms, more particularly 12 to 36 carbon atoms and/or at least one cycloaliphatic structure containing at least 6 carbon atoms, preferably 6 to 12 carbon atoms. More particularly, said monomer c) is selected from:
at least one alkyl (meth)acrylate, said alkyl, which may be linear or branched, containing at least 6 carbon atoms, preferably at least 12 carbon atoms, more particularly 12 to 36 carbon atoms, or from at least one ester of $C_{18}$ to $C_{36}$ fatty acids with a hydroxyalkyl (meth)acrylate or at least one ester of a vinyl alcohol with at least one linear or branched acid containing at least 6 carbon atoms, preferably at least 9 carbon atoms, more particularly 9 to 36 carbon atoms.

Still more particularly, said monomer c) is selected from at least one monomer from the group composed of: lauryl, isodecyl, decyl, dodecyl, stearyl, 2-ethylhexyl, isooctyl, 2-octyl, 2-octyldecyl, tridecyl, 2-octyl dodecyl (meth)acrylate, esters (monoesters) of dimers (Cu) of fatty acids with a hydroxyalkyl (meth)acrylate, the glycidyl (meth)acrylate ester of a saturated branched $C_{10}$ carboxylic acid, in particular highly branched $C_{10}$ such as the glycidyl (meth) acrylate ester of versatic acid, said glycidyl ester being known as "Cardura® E10", or the glycidyl (meth)acrylate ester of a branched $C_9$ carboxylic acid, in particular highly branched $C_9$, or vinyl esters of branched $C_{10}$ carboxylic acid, in particular highly branched $C_{10}$ such as versatic acid known by the commercial name of VeoVa 10, or vinyl esters of saturated branched $C_9$ carboxylic acid, in particular highly branched $C_9$, known by the commercial name VeoVa 9, vinyl esters of $C_{18}$ fatty acids, dimers ($C_{36}$) of fatty acids or monomers with a cycloaliphatic structure, in particular selected from: isobornyl, isophoryl, tertiobutylcyclohexyl, 3,3,5-trimethylcyclohexyl (meth)acrylate, cyclohexyl methacrylate, esters of monoalkyl esters (acid ester), with $C_1$ to $C_{18}$ alkyl, of m, p-hexahydrophthalic acid (or 1,3 or 1,4-cyclohexane dioic acid monoesterified with $C_1$ to $C_{18}$ alkyl) with hydroxyalkyl (meth)acrylates. A branched structure of the invention comprises at least one branch per structure (chain or molecule). A highly branched structure signifies the presence of at least 2 and preferably at least 3 branches per structure.

In accordance with a more particular version of the resin of the invention, it comprises hydrophobic monomers selected from methacrylic esters of linear or branched $C_6$ to $C_{36}$ alcohols, more preferably $C_6$ to $C_{18}$ and still more preferably $C_8$ to $C_{14}$, and/or vinyl esters of carboxylic acids with a linear or branched $C_6$ to $C_{36}$ chain, more preferably $C_6$ to $C_{18}$ and still more preferably $C_8$ to $C_{14}$.

In accordance with a yet more particular embodiment, said resin of the invention is based on an overall composition of monomers comprising:
- as monomer c), at least one selected from: a (meth)acrylic ester of a $C_8$ to $C_{14}$ alcohol, preferably $C_{12}$, and/or at least one vinyl ester of a $C_8$ to $C_{14}$ acid, preferably $C_9$ to $C_{12}$, and
- as monomer a), at least one selected from vinyl carbonates and ethylenically unsaturated esters carrying a cyclic carbonate group, in particular from: glycerol carbonate (meth)acrylate, itaconate, maleate, fumarate or tetrahydrophthalate, more preferably glycerol carbonate (meth)acrylate.

More particularly, said resin may have a number average molecular mass Mn, measured by GPC (in polystyrene equivalents, in THF) of 2 000 to 10 000 g/mol, preferably 3 000 to 10 000 g/mol, more preferably 3 000 to 8 000 g/mol and still more preferably 3 000 to 7 000 g/mol.

In accordance with a particular embodiment of the invention, said resin is in the form of a solution in one or more organic diluents, preferably polar, with a resin content of 70% to 95%, preferably 80% to 95%. A polar diluent carries at least one polar group. Suitable examples of diluents of this type which may be cited are those comprising the groups: esters, ethers, sulfoxides, amides, alcohols, ketones or aldehydes. In accordance with a particular and preferred option, said organic diluent is a reactive diluent and carries at least two functions that are reactive with a primary or secondary amine; preferably, said functions are selected from hydroxyls, in particular for reaction with melamines and/or acetoacetates and/or epoxides and/or ethylenically unsaturated bonds, these latter (the unsaturated bonds) being capable of reacting with said primary or secondary amine by Michael addition.

Preferably, said reactive functions of said diluent are selected from epoxy, acetoacetate or ethylenically unsaturated bond. Said diluent must not react with the functional groups carried by the resin of the invention. In particular, in the case in which said reactive diluent carries hydroxyl or epoxy functions, said diluent is added to said resin at ambient temperature, after the preparation of said resin by polymerization.

Said resin may comprise at least one copolymer, i.e. one or more copolymers, in its composition, said copolymer possibly being acrylic, vinyl or vinyl-acrylic, corresponding to the overall definition of said resin, in particular as regards its composition and characteristics.

In accordance with a particularly preferred embodiment, said resin is a blend of at least two, more particularly two different copolymers P1 and P2, in particular selected from acrylic, vinyl or vinyl-acrylic copolymers, with:
P1: 50% to 95% by weight, preferably 60% to 95% by weight with respect to the overall weight of said two copolymers (P1+P2), of a first copolymer P1 possibly not comprising a carboxylated ethylenically unsaturated monomer in accordance with b) as defined above, preferably not comprising said carboxylated monomer in accordance with b) as defined above,
P2: 5% to 50% by weight, preferably 5% to 40% by weight of a second copolymer (P2) comprising at least one carboxylated ethylenically unsaturated monomer in accordance with b) as defined above,
in which P1 is more hydrophobic than P2, preferably with a difference in hydrophobicity, expressed as the logarithm of the octanol/water partition coefficient, in particular as log Kow using the KowWin method described above, of at least 0.15 units, more preferably at least 0.25 units and still more preferably at least 0.3 units, and P1 having a zero or significantly lower acid value than that of P2, preferably with a delta of at least 10 mg KOH/g with respect to the dry resin and more preferably the two copolymers having substantially the same number of cyclic carbonate groups, ±1%.

In accordance with one possibility for said resin, said copolymers have glass transition temperatures Tg1 and Tg2 that are substantially identical, ±5%, and which are in the range from −40° C. to 120° C. Unless otherwise indicated, all of the glass transition temperatures as defined in the invention above and below are values measured by DSC and correspond to the temperatures of the point of inflexion after 2 passes from −50° C. to 110° C. at 10° C./min. In accordance with a second possibility, said copolymers have different glass transition temperatures, preferably with one of said copolymers P1 or P2 having a high Tg, in particular more than 40° C., more preferably more than 40° C. and not exceeding 120° C., and the other having a lower Tg. More particularly, in accordance with this second possibility and in accordance with a first option within this possibility, said copolymer with said high Tg is said copolymer P1 as defined above in accordance with the invention and said copolymer with said lower Tg is said copolymer P2, also as defined above in accordance with the invention. In accordance with a second option within this possibility, said high and lower Tgs are reversed with respect to the copolymers P and P2. Thus, said copolymer with said high Tg is the copolymer P2 as defined above in accordance with the invention and said copolymer with said lower Tg is the copolymer P1, also as defined above in accordance with the invention.

The monomer b), which is ethylenically unsaturated and carries at least one carboxylic acid group ($—CO_2H$), the essential component of the resin of the invention, may be selected from: acrylic or methacrylic acid, itaconic acid and anhydride, maleic acid and/or anhydride, fumaric acid (isomer of maleic acid), tetrahydrophthalic acid and/or anhydride (THP acid/anhydride), hemi-esters of dibasic carboxylic acids with a hydroxyalkyl (meth)acrylate, said alkyl being from $C_2$ to $C_4$ and optionally possibly being alkoxylated, in particular with a $C_2$ and/or $C_3$ and/or $C_4$ alkoxy, or from hemi-esters of dibasic carboxylic acid with a monohydroxylated oligomer of polyether-mono(meth)acrylate or polyester-mono(meth)acrylate, preferably polyether diol oligomers or polyester diols acting as a base for these (meth)acrylic oligomers carrying a carboxylic acid function with a number average molecular mass Mn (calculated by measuring the terminal functions) of less than 1 000 and preferably less than 500. Preferred monomers with type b) are acrylic acid and/or methacrylic acid and itaconic acid, and more preferably acrylic and/or methacrylic acid.

The monomers with type d) as defined above are optional components of the resin of the invention and are present in order to adjust the final performances of the resin as a function of its use. They differ from the monomers with type a), b) and c) and may carry functional groups that differ from those of the monomers with type a) and b), and for this reason they do not carry any group that might be susceptible of reacting with a carbonate or carboxylic acid group, and also no group that might be susceptible of reacting with a functional group of another monomer as a component of said reactor, excluding any cross-linking reactions in the preparation of said resin.

This means that the composition of the resin is selected such that no internal reaction (of cross-linking) can take place between two monomeric components of said resin. In fact, no internal cross-linking reaction may take place in said resin because of a single monomer or because of two or more monomers which are mutually reactive. By definition, said resin is soluble in an organic medium and thus cannot be in the cross-linked form in its internal structure.

Examples of potential monomers with type d) which may be cited are as follows, with the condition that there is a differentiation between monomers a), b) and c) selected for the resin and the conditions discussed above: aromatic vinyl monomers, monomers carrying amide groups such as acrylamide, monomers carrying ureido groups, monomers carrying acetoxy groups, ethylenically unsaturated monomers comprising a linear or branched aliphatic or cycloaliphatic group containing fewer than 6 carbon atoms.

The resin of the invention may be prepared by radical solution polymerization in an organic medium, preferably in an organic diluent which can react with a primary or secondary amine as defined above, provided that said reactive diluent is unable to react with the functional groups carried by said resin, in particular during polymerization. In the case in which said diluent carries functions such as a hydroxyl or epoxy which could react with the groups (for example carboxylic acids b)) of said resin, then in this case, said reactive diluent is added after polymerization and under conditions which prevent a reaction of this type.

The second aspect of the invention concerns an aqueous dispersion of resin, which dispersion comprises at least one resin as defined in accordance with the invention above in the completely or partially neutralized form. "Completely or partially neutralized" refers to the carboxylic acid group of said resin. In accordance with a particular preference, said dispersion is free from any surfactants. This means that, by its composition and specific structure, said resin is capable of forming a stable dispersion without the need for any surfactant.

Neutralization may be carried out with an organic base that, under the neutralization conditions, selectively neutralizes the acid groups (carboxylic) of said resin without affecting the other (than acid) groups of said resin and preferably with a tertiary amine, more preferably carrying at least one hydroxyl group such as, for example, triethanolamine or dimethyl ethanolamine.

In accordance with a particular embodiment, said dispersion is partially neutralized with a degree of neutralization of at least 30%, preferably at least 40% with respect to the carboxylic functions or groups in said resin. Said aqueous dispersion of resin may have a solids content of 30% to 60%, preferably 40% to 60%. It should be noted that in the case in which said diluent is reactive, said solids content encompasses said reactive diluent. This content may be measured using the ISO 3251 method.

A third aspect of the present invention is provided by a process for the preparation of an aqueous dispersion as defined above, which process comprises a step for preparation of said resin as defined in the invention in the form of a solution in one or more organic diluents, preferably polar, followed by a step for partial or total neutralization and then by a step for dispersion in water, optionally with a final step for elimination of said organic diluent, in particular if it is non-reactive, with a primary or secondary amine and a step for adjusting the solids content and the viscosity by dilution in water.

More particularly, said process comprises the following steps:
  i) preparing a resin as defined in accordance with the invention, in solution in one or more organic diluent(s), preferably polar,
  ii) optionally, diluting said resin in order to adjust the viscosity of the solution of resin,
  iii) partially or totally neutralizing said resin, preferably with an organic base that, under the neutralization conditions, selectively neutralizes the acid groups (carboxylic) of said resin without affecting the other (than acid) groups of said resin,
  iv) preparing a dispersion of said solution of resin in an aqueous medium,
  v) optionally, eliminating said organic diluent, in particular if it is not reactive with a primary or secondary amine, preferably by entrainment in steam (also known as steam stripping) or entrainment (or stripping) with an inert gas,
  vi) adjusting the final dilution or the final solids content.

Said step iv) of the process described above preferably comprises a step for adding water to said solution of resin, until phase inversion occurs, followed by adjusting the dilution (with water) having regard to the envisaged solids content.

In accordance with this process of the invention, said resin may be an acrylic, vinyl or vinyl-acrylic resin, including styrene-acrylic, and in these cases, step i) for preparation of said resin comprises a radical polymerization of the corresponding monomers in a solvent medium.

More particularly, the process of the invention concerns a resin that is a blend of at least two, more particularly two different copolymers P1 and P2 as defined above and in this case said step i) for the preparation of said resin comprises the separate preparation of said copolymers P1 and P2 in solution, followed by mixing them, or alternatively, in two successive steps in the same reactor:
  i1) firstly, preparing a solution of the first copolymer P1 as defined above in accordance with the invention, and then
  i2) preparing a second copolymer P2 as defined above in accordance with the invention, in the same reactor already containing said first copolymer P1 in solution.

The present invention also concerns a cross-linkable aqueous composition of organic binder, which composition comprises at least one resin or at least one aqueous dispersion of resin as defined in accordance with the present invention. Preferably, such a composition additionally comprises a cross-linking agent selected from primary and/or secondary polyamines with a functionality of at least 2.

In accordance with a particularly preferred case, said composition is a coating composition behaving as a reactive two-component composition. This means that said polyamine reacts with the cyclic carbonate groups of said resin as soon as it is added to the composition containing said resin and irreversibly changes over time to produce a final cross-linked polyurethane forming a polymeric network with an infinite molecular mass and a three-dimensional structure. As a consequence, in such a case, addition of the polyamine cross-linking agent is carried out just before final use and application of said cross-linkable composition.

In accordance with another preferred option of said cross-linkable coating composition of the invention, said polyamine is blocked by a labile agent and in this case said coating composition behaves as a cross-linkable mono-component coating composition. This means that said composition remains stable on storage at ambient temperature after addition of said polyamine which has been blocked in this manner. In such a case, cross-linking is carried out during use, by drying then application-film formation of the composition, in order to liberate the labile blocking agent, which is preferably volatile, and thus to make the cross-linking reaction possible.

In accordance with a particularly preferred case, said cross-linkable composition comprises said organic diluent of said resin in solution and said diluent is reactive with said polyamine (cross-linking agent) as defined above.

Said polyamines with a functionality of at least 2, which are suitable as cross-linking agents in an aqueous medium for the cross-linkable compositions of the invention, are polyamines with a linear or branched structure, carrying at least two primary and/or secondary amine functions, said polyamines being soluble or dispersible in water. These polyamines may be monomers and/or oligomers, these latter having an Mn that does not exceed 1 500, preferably no more than 1 000. They may be aliphatic or cycloaliphatic in structure and possibly aromatic, in the latter case (aromatic) with the amine function preferably being carried by an alkyl substituent on the aromatic ring such as, for example, xylylene diamine (1,3- and 1,4-). Examples of oligomeric polyamines that may be cited are those based on linear or branched oligomers with an Mn of less than 1 000, such as polyether amines, for example of the Jeffamine® type, which are acrylic amine-containing oligomers based on a monomer carrying a primary or secondary amine function, or polyethylene amines (or imines). Examples of monomeric polyamines that may be cited are fatty polyamines and in particular fatty polyamines of renewable origin such as dimeric diamines based on fatty amines of renewable origin (bioresources), xylylene diamines or isophorone diamines.

Said polyamine may be added to the aqueous cross-linkable composition, either as it is and be dispersed/dissolved in said composition, or in the form of a preformed aqueous solution or dispersion, optionally in the presence of a suitable surfactant. Partial neutralization of said polyamine, in particular by a volatile carboxylic acid such as formic or acetic or carbonic ($H_2CO_3$) acid, may optionally facilitate the dispersion/solubility in aqueous media and at the same time allow reversible blocking of said amine for a cross-linkable composition that behaves as a mono-component system and reacts during film formation and drying of the coating application formulation.

Preferred polyamines that may be cited are: polyether amines, polyethylene amines, acrylic amine-containing oligomers with an Mn of less than 1 000, fatty polyamines, in particular dimeric diamines based on fatty amines of renewable origin, xylylene diamines or isophorone diamines.

In accordance with a more particular version, said cross-linkable coating composition further comprises a second cross-linking agent with a functionality of at least 2, which is reactive with the hydroxyl group obtained from the formation of the urethane linkage by reaction between a cyclic carbonate group and an amine function, said cross-linking agent preferably being selected from: melamine, cross-linking agents carrying epoxy functions, trialkoxysilanes or carboxylic acid or carboxylic anhydride. By definition, said second cross-linking agent can only react with said hydroxyl group after reaction between a cyclic carbonate group and an amine function in order to form a urethane linkage and said hydroxyl group formed in the β-position.

The present invention also concerns the use of at least one resin as defined in accordance with the invention in the preparation of polyurethanes that are cross-linked without the use of polyisocyanate starting from cross-linkable compositions as defined above in accordance with the invention. More particularly, this use concerns applications in aqueous coatings, in particular in paints, colored or colorless varnishes, inks, adhesives, glues, sealants, fiber and textile treatments.

Preferably, in this use, said coatings are:
protective coatings, in particular finishing coats or anti-corrosion coatings, or
decorative coatings, said coatings in particular being for substrates selected from: metals such as iron, steel, bronze, copper, aluminum, glass, wood including pressed wood or plywood, cardboard, plaster, concrete, plastics, composites, natural, mineral or synthetic fibers including textiles corresponding to these fibers, and ceramics.

These coatings have high wear resistance performances and resistance to abrasion and/or intensive use under severe external climate conditions of use and are particularly suitable for applications in the following fields: railroad construction and renovation (high speed trains, regional express networks, subways), automotive, road transport, naval, aviation, agricultural machinery, civil engineering plant, wind turbines, oil platforms, containers, metal structures, metallic frameworks, coils or buildings including furnishings, flooring, joinery and woodwork.

In a final aspect, the invention concerns a final product obtained. It is a cross-linked polyurethane that results from cross-linking at least one resin in accordance with the invention with a polyamine having a functionality of at least 2 or which is obtained from a cross-linkable aqueous composition as defined above in accordance with the invention. More particularly, it is a cross-linked coating based on said polyurethane.

The following examples are provided by way of illustration of the products of the invention and their performances and do not in any way limit the scope of the claimed subject matter.

Experimental Section

1) Starting Materials Used:
These materials are presented in Table 1 below

TABLE 1

Starting materials used

| Chemical name or commercial product name | Abbreviated name used | Supplier | Function in the invention |
|---|---|---|---|
| Styrene | STY | Ciron | Monomer type d) |
| Butyl acrylate | ABU | Arkema | Monomer type d) |
| Methyl methacrylate | MAM | Evonik | Monomer type d) |
| Glycerol carbonate methacrylate * (or propylene carbonate methacrylate) | GCM | — | Monomer type a) |
| Lauryl methacrylate | MALAU | Sartomer | Monomer type c) |
| Acrylic acid | AA | Arkema | Monomer type b) |
| Luperox ® DI | DTBP | Arkema | Radical_generator (initiator) |
| Luperox ® 26 | TBPO | Arkema | Radical_generator (initiator) |

TABLE 1-continued

Starting materials used

| Chemical name or commercial product name | Abbreviated name used | Supplier | Function in the invention |
|---|---|---|---|
| Ektapro® EEP (ethyl 3-ethoxypropionate) | EEP | Aldrich | Solvent (non-reactive diluent) |
| Lonzamon® AATMP | AATMP | Lonza | Reactive acetoacetylated diluent (functionalized acetoacetoxy) with functionality = 7.76 mmol/g |
| Triethanolamine | TEOH | Aldrich | Organic neutralization base |

* prepared in accordance with Example 1 of U.S. Pat. No. 7,414,147

2) Preparation of Resin Carrying Cyclic Carbonate Functions and its Aqueous Dispersion The example described below illustrates the preparation of the resin and the corresponding aqueous dispersion of the invention.

Example 1 (in Accordance with the Invention)

1a) Resin 225 g of ethyl 3-ethoxypropionate (EEP) was introduced into a 2 liter reactor. The reactor was heated to 150° C., flushing with nitrogen. At the same time, (for composition P1), 415 g of styrene, 54 g of butyl acrylate, 250 g of methyl methacrylate, 369 g of propylene carbonate methacrylate (or glycerol carbonate methacrylate) and 36 g of lauryl methacrylate were mixed. A solution was prepared with 33.7 g of ditertiobutyl peroxide (DTBP) and 16.9 g of tertiobutyl peroctoate (TBPO) in 51 g of EEP. These two preparations were then introduced into the reactor at the same time over a period of 3 h, with the temperature being maintained at 150° C. throughout this period and flushing with nitrogen. At the end of these additions, the medium was kept at the same temperature for 1 h before being cooled to 135° C. At the same time, a mixture (for composition P2) was prepared, formed by 78 g of styrene, 54 g of butyl acrylate, 57 g of methyl methacrylate, 123 g of propylene carbonate methacrylate, 11 g of lauryl methacrylate and 52 g of acrylic acid. A solution of 11.2 g of DTBP and 5.6 g of TBPO in 16.9 g of EEP was also prepared. These two preparations were introduced into the reactor at 135° C. over a period of 2 h. At the end of these additions, the introduction lines were rinsed with solvent and the temperature was kept constant at 135° C. for a supplemental 1 h. The dry extract of the resin (test using 1 g for 1 h at 125° C.) was thus 89.7% and its measured acid value was equal to 26.3 mg of KOH/g (vs calculated: 26.8). The number average molecular mass Mn of this resin, as measured by GPC with THF as the solvent and with calibration using monodispersed polystyrenes, was 3 600.

1b) Aqueous Dispersion

A 259 g portion of this resin (as described above, in 1a)) was partially neutralized by adding 72.2 ml of a 10% by volume solution of triethanolamine (TEOH) in water over a period of 15 min. During this step, the temperature was kept at 70° C. and the stirring speed was 150 rpm (revolutions per minute). After stirring for 15 min, the medium was cooled to 65° C. and 148.2 ml of water was introduced over 45 min at a stirring rate of 250 rpm, with phase inversion during this addition. The emulsion obtained was then diluted with water in order to obtain a dry extract of 45.6%, a pH of 7.5, and a measured particle size of 162 nm with a polydispersity index of 0.075.

Example 2 (in Accordance with the Invention)

2a) Resin 150 g of ethyl 3-ethoxypropionate (EEP) and 75 g of Lonzamon® AATMP were introduced into a 2 liter reactor. The reactor was heated to 150° C., flushing with nitrogen. At the same time, (for composition P1), 460 g of styrene, 58 g of butyl acrylate, 278 g of methyl methacrylate, 288 g of propylene carbonate methacrylate (or glycerol carbonate methacrylate) and 41 g of lauryl methacrylate were mixed. A solution was prepared with 33.7 g of ditertiobutyl peroxide (DTBP) and 16.9 g of tertiobutyl peroctoate (TBPO) in 51 g of EEP. These two preparations were then introduced into the reactor at the same time over a period of 3 h, with the temperature being maintained at 150° C. throughout this period and flushing with nitrogen. At the end of these additions, the medium was kept at the same temperature for 1 h before being cooled to 135° C. At the same time, a mixture (for composition P2) was prepared, formed by 87 g of styrene, 60 g of butyl acrylate, 63 g of methyl methacrylate, 96 g of propylene carbonate methacrylate, 12 g of lauryl methacrylate and 57 g of acrylic acid. A solution of 11.2 g of DTBP and 5.6 g of TBPO in 16.9 g of EEP was also prepared. These two preparations were introduced into the reactor at 135° C. over a period of 2 h. At the end of these additions, the introduction lines were rinsed with solvent and the temperature was kept constant at 135° C. for a supplemental 1 h. The dry extract of the resin (test using 1 g for 1 h at 125° C.) was thus 87.9% and its measured acid value was equal to 25.7 mg of KOH/g (vs calculated: 28.1). The number average molecular mass Mn of this resin, as measured by GPC with THF as the solvent and with calibration using monodispersed polystyrenes, was 3 550 g/mol.

2b) Aqueous Dispersion

A 234 g portion of this resin (as described above, in 2a)) was partially neutralized by adding 62.6 ml of a 10% by volume solution of triethanolamine (TEOH) in water over a period of 15 min. During this step, the temperature was kept at 70° C. and the stirring speed was 150 rpm. After stirring for 15 min, the medium was cooled to 65° C. and 160.4 ml of water was introduced over 45 min at a stirring rate of 250 rpm, with phase inversion during this addition. The emulsion obtained was then diluted with water in order to obtain a dry extract of 46.3%, a pH of 7.5, and a measured particle size of 175 nm with a polydispersity index of 0.24.

TABLE 2

Composition of the resin of Example 1 and hydrophobicity of the monomers
Resin of Example 1

| | | Copolymer | | |
|---|---|---|---|---|
| Component | Hydrophobicity, logKow (Calculated using KowWin) | P1 % by weight in P1 vs resin (vs P1) | P2 % by weight in P2 vs resin (vs P2) | Total (Resin) Total % by weight vs resin |
| STY | 2.8950 | 27.7 (36.9) | 5.2 (20.8) | 32.9 |
| ABU | 2.2011 | 3.6 (4.8) | 3.6 (14.4) | 7.2 |
| MAM | 1.2751 | 16.7 (22.3) | 3.8 (15.2) | 20.5 |
| GCM | 0.5214 | 24.6 (32.8) | 8.2 (32.8) | 32.8 |

TABLE 2-continued

Composition of the resin of Example 1
and hydrophobicity of the monomers
Resin of Example 1

| | | Copolymer | | |
|---|---|---|---|---|
| Component | Hydrophobicity, logKow (Calculated using KowWin) | P1 % by weight in P1 vs resin (vs P1) | P2 % by weight in P2 vs resin (vs P2) | Total (Resin) Total % by weight vs resin |
| MALAU | 6.6772 | 2.4 (3.2) | 0.75 (3.0) | 3.15 |
| AA | 0.4415 | 0 (0) | 3.45 (13.8) | 3.45 |

TABLE 3

Characteristics of the resin of Example 1

| | Resin of Example 1 Copolymer | |
|---|---|---|
| | P1 | P2 |
| % by weight/resin | 75 | 25 |
| Calculated acid value (mg KOH/g) | 0 | 107.3 |
| Hydrophobicity, logKow weighted average | 1.843 | 1.545 |
| Carbonate content, calculated (mmol/g) | 1.76 | 1.76 |
| Overall acid value/resin calculated/measured (mg KOH/g) | 26.8/26.3 | |
| Overall carbonate content/resin calculated (mmol/g) | 1.76 | |
| Overall hydrophobicity logKow Weighted average/resin | 1.769 | |

TABLE 4

Composition of the resin of Example 2
and hydrophobicity of the monomers
Resin of Example 2

| | | Copolymer | | |
|---|---|---|---|---|
| Component | Hydrophobicity, logKow (Calculated using KowWin) | P1 % by weight in P1 vs resin (vs P1) | P2 % by weight in P2 vs resin (vs P2) | Total (Resin) Total % by weight vs resin |
| STY | 2.8950 | 30.7 (40.9) | 5.8 (23.2) | 36.5 |
| ABU | 2.2011 | 3.9 (5.2) | 4.0 (16.0) | 7.9 |
| MAM | 1.2751 | 18.5 (24.7) | 4.2 (16.8) | 22.7 |
| GCM | 0.5214 | 19.2 (25.6) | 6.4 (25.6) | 25.6 |
| MALAU | 6.6772 | 2.7 (3.6) | 0.8 (3.2) | 3.5 |
| AA | 0.4415 | 0 (0) | 3.8 (15.2) | 3.8 |

TABLE 5

Characteristics of the resin of Example 2

| | Resin of Example 2 Copolymer | |
|---|---|---|
| | P1 | P2 |
| % by weight/resin | 75 | 25 |
| Calculated acid value (mg KOH/g) | 0 | 118.2 |
| Hydrophobicity, logKow weighted average | 1.987 | 1.652 |
| Carbonate content, calculated (mmol/g) | 1.37 | 1.37 |
| Overall acid value/resin calculated/measured (mg KOH/g) | 28.1/25.7 | |
| Overall carbonate content/resin calculated (mmol/g) | 1.37 | |
| Overall functionality of reactive diluent/resin calculated (mmol/g) | 0.39 | |
| Overall reactive functionality/resin calculated (mmol/g) | 1.76 | |
| Overall hydrophobicity logKow Weighted average/P1 + P2 | 1.903 | |

3) Methods and Tests Used to Characterize the Resins and the Performances of the Cross-Linked Coatings Obtained (Operating Conditions)

3.1) Measurement of dry extract (solids content) of the resin: in accordance with ISO 3251 (1 g of resin in solution for 1 h at 125° C.).

3.2) Acid value of the resin: in accordance with ISO 2114
Otherwise, and depending on the indication, by calculation using the material balance. It is expressed in mg of KOH per g of dry resin.

3.3) Cyclic carbonate functionality in mmol/g of resin, by calculating the carbonate functions incorporated with the carbonate carrying monomer, by the material balance. It is expressed in mmol per g of dry resin.

3.4) Mean particle size and polydispersity index: measured in accordance with the standard ISO 13321.

3.5) Measurement of pH of the emulsion: carried out in accordance with the standard ISO 976.

3.6) Mn, in particular for the resin of the invention: by GPC in THF, with calibration based on monodispersed polystyrene samples with Mn expressed in polystyrene equivalents.

3.7) Hydrophobicity of the dry resin: starting from log Kow values calculated by the KowWin method (software) (version epi 4.11 from SRC) for the monomeric components and weighted average calculated from these log Kow values, as already explained in the description.

3.8) Evaluation of pinhole limit of coating
The presence (or absence) of pinholes as well as their scores were assessed by evaluating the degree of blistering in accordance with the standard ISO 4628-2. This standard can be used to both quantify the density of pinholes present (if present) on the coating and to assess their size.

To demonstrate this pinhole limit, various films are applied with increasing dry thicknesses and the maximum dry thickness for which a film without pinholes is obtained is recorded, i.e. it is the limiting maximum thickness just before the appearance of pinholes or blistering.

4) Preparation of the Aqueous Cross-Linkable Coating Composition 4.1) Formulation of Colorless Varnishes with the Aqueous Dispersions of Examples 1b) and 2b)

TABLE 6

Starting materials used for formulation

| Name | Supplier | Technical function |
|---|---|---|
| Jeffamine ® D230 | Huntsman | Polyether polyamine cross-linking agent with functionality of primary amine of 2 and molecular weight of 230 |

TABLE 6-continued

Starting materials used for formulation

| Name | Supplier | Technical function |
|---|---|---|
| CRAYVALLAC ® A-2678M | Arkema | Surface additive |
| Coapur ® 6050 | Coatex | Rheological additive |

TABLE 7

Composition by weight of 2k cross-linkable colorless varnish formulations (weight in g)

|  | Varnish 1 | Varnish 2 |
|---|---|---|
| Aqueous dispersion of Example 1b) | 69.82 | / |
| Aqueous dispersion of Example 2b) | / | 69.76 |
| Water | 22.54 | 22.52 |
| CRAYVALLAC ® A-2678M | 0.60 | 0.60 |
| Coapur ® 6050 | 0.48 | 0.57 |
| Jeffamine ® D230 | 6.56 | 6.55 |

4.2) Operating Conditions for Preparation of Varnish Formulations, and Cross-Linking The quantity of aqueous resin dispersion as prepared above (1 b) or 2)) was poured into a cylindrical receptacle (250 ml). The water, surface additive, rheological additive and polyamine cross-linking agent were added, with stirring at 500 rpm (with a Dispermat® CV) at ambient temperature (20-25° C.). The varnish formulation was then applied to a QD46 type steel support (Q-Panel) with a Barecoater applicator (speed 3, corresponding to 20 mm/s) in order to obtain a controlled dry thickness. The varnish applied thereby was initially dried at ambient temperature (20-25° C. at 50% RH) for 15 min before being cross-linked in an oven at a temperature of 90° C. for a period of 30 min.

5) Performances of Cross-Linked 2k Varnish Coating

The films of cross-linked polyurethane varnish obtained had a good visual appearance with good film forming and a good gloss.

As already described above, these representative films of the invention did not exhibit any pinholes (blistering) after evaluation using the described test, in contrast to standard films of polyurethane coatings obtained with polyisocyanates in aqueous media and with maximum thicknesses without pinholes of 70 μm at best.

The invention claimed is:

1. An organic resin soluble in organic media obtained from structural units comprising:
   a) at least one ethylenically unsaturated monomer carrying a cyclic carbonate group,
   b) at least one ethylenically unsaturated monomer carrying at least one carboxylic acid group,
   c) at least one ethylenically unsaturated hydrophobic monomer having a hydrophobic value, said value estimated by a logarithm of partition coefficient between octanol and water, using logKow with the estimation method EPI Suite® KowWin from SRC of at least 3,
   d) optionally, at least one other ethylenically unsaturated monomer that is different from said monomers a), b) or c) and does not carry any group that is susceptible of reacting with a carbonate group or carboxylic acid group, and also lacking any group that is susceptible of reacting with a functional group of another monomeric component of said resin, any cross-linking reactions in the preparation of said resin being excluded, overall, said resin having:
   an acid value of at least 10, mg KOH/g with respect to the dry resin, and
   a cyclic carbonate group content of 0.5 to 3.5 mmol/g, with respect to the dry resin.

2. The resin as claimed in claim 1, wherein said monomer c) comprises at least one linear or branched aliphatic group containing at least 6 carbon atoms, and/or at least one cycloaliphatic structure containing at least 6 carbon atoms.

3. The resin as claimed in claim 1 wherein said monomer c) is selected from: at least one alkyl (meth)acrylate, said alkyl, which may be linear or branched, containing at least 6 carbon atoms, or from at least one ester of $C_{18}$ to $C_{36}$ fatty acids with a hydroxyalkyl (meth)acrylate, or at least one ester of a vinyl alcohol with at least one linear or branched acid containing at least 6 carbon atoms.

4. The resin as claimed in claim 1 wherein said monomer c) is selected from at least one monomer from the group consisting of: lauryl, isodecyl, decyl, dodecyl, stearyl, 2-ethylhexyl, isooctyl, 2-octyl, 2-octyldecyl, 2-octyldodecyl, tridecyl, (meth)acrylate, esters of dimers ($C_{36}$) of fatty acids with a hydroxyalkyl (meth)acrylate, the glycidyl (meth)acrylate ester of a saturated branched $C_{10}$ carboxylic acid, the glycidyl (meth)acrylate ester of a branched $C_9$ carboxylic acid, vinyl esters of branched $C_{10}$ carboxylic acid, vinyl esters of saturated branched $C_9$ carboxylic acid, vinyl esters of $C_{18}$ fatty acids, dimers ($C_{36}$) of fatty acids or monomers with a cycloaliphatic structure, and esters of monoalkyl esters, with $C_1$ to $C_{18}$ alkyl, of m, p-hexahydrophthalic acid (or 1,3 or 1,4-cyclohexane dioic acid monoesterified with $C_1$ to $C_{18}$ alkyl) with hydroxyalkyl (meth)acrylates.

5. The resin as claimed in claim 1 comprising hydrophobic monomers selected from the group consisting of methacrylic esters of linear or branched $C_6$ to $C_{36}$ alcohols, and vinyl esters of carboxylic acids with a linear or branched $C_6$ to $C_{36}$ chain.

6. The resin as claimed in claim 1 obtained from structural units comprising:
   as monomer c), at least one selected from the group consisting of: a (meth)acrylic ester of a $C_8$ to $C_{14}$ alcohol, and at least one vinyl ester of a $C_8$ to $C_{14}$ acid and
   as monomer a), at least one selected from the group consisting of: vinyl carbonates and ethylenically unsaturated esters carrying a cyclic carbonate group selected from the group consisting of glycerol carbonate (meth)acrylate, itaconate, maleate, fumarate and tetrahydrophthalate.

7. The resin as claimed in claim 1 having a number average molecular mass Mn, measured by GPC (in polystyrene equivalents, in THF) of 2,000 to 10,000 g/mol.

8. The resin as claimed in claim 1 in the form of a solution in one or more organic diluents, with a resin content of 70% to 95%.

9. The resin as claimed in claim 8, wherein said organic diluent is a reactive diluent and carries at least two functional groups that are reactive with a primary or secondary amine; said functional groups are selected from the group consisting of: hydroxyls, acetoacetates, epoxides, and ethylenically unsaturated bonds.

10. The resin as claimed in claim 1 comprising at least one acrylic, vinyl or vinyl-acrylic copolymer corresponding to the definition of said resin.

11. The resin as claimed in claim 10, that is a blend of at least two different copolymers P1 and P2 selected from acrylic, vinyl or vinyl-acrylic copolymers, with:

P1 being: 50% to 95% by weight, with respect to the overall weight of said two copolymers of a first copolymer P1 optionally comprising a carboxylated ethylenically unsaturated monomer in accordance with b), P2 being: 5% to 50% by weight, of a second copolymer comprising at least one carboxylated ethylenically unsaturated monomer in accordance with b), wherein P1 is more hydrophobic than P2, and P1 having a zero or lower acid value than that of P2.

12. The resin as claimed in claim 11, wherein said copolymers have glass transition temperatures Tg1 and Tg2 that are substantially identical, and which are in the range from −40° C. to 120° C., said Tgs being measured by DSC.

13. The resin as claimed in claim 1, wherein said copolymers have different glass transition temperatures, with one of said copolymers P1 or P2 having a high Tg greater than 40° C. and not exceeding 120° C., and the other having a lower Tg, said Tgs being measured by DSC.

14. The resin as claimed in claim 13, wherein said copolymer with said high Tg is said copolymer P1 and said copolymer with said lower Tg is said copolymer P2.

15. The resin as claimed in claim 13, wherein said copolymer with said high Tg is the copolymer P2 and said copolymer with said lower Tg is the copolymer P1.

16. An aqueous dispersion of resin, comprising at least one resin as defined in claim 1, in totally or partially neutralized form.

17. The dispersion as claimed in claim 16, said dispersion being free of surfactant.

18. The dispersion as claimed in claim 16, that is partially neutralized with a degree of neutralization of at least 30%, with respect to the carboxylic functional groups in said resin.

19. An aqueous dispersion of resin as claimed in claim 16 having a solids content of 30% to 60%.

20. A process for the preparation of an aqueous dispersion as claimed in claim 16, said process comprising the steps of preparation of said resin in the form of a solution in one or more organic diluents, followed by partial or total neutralization, and then by dispersion in water, optionally with elimination of said organic diluent, and adjusting the solids content and the viscosity by dilution in water.

21. The process as claimed in claim 20, comprising the following steps:
 i) preparing a resin, in solution in one or more organic diluent(s),
 ii) optionally, diluting said resin in order to adjust the viscosity of the solution of resin,
 iii) partially or totally neutralizing the acidity of said resin, that, under the neutralization conditions, selectively neutralizes the acid groups (carboxylic) of said resin without affecting the other (than acid) groups of said resin,
 iv) preparing a dispersion of said solution of resin in an aqueous medium,
 v) optionally, eliminating said organic diluent, by steam stripping or entrainment stripping with an inert gas,
 vi) adjusting the final dilution or the final solids content.

22. The process as claimed in claim 21, wherein step iv) comprises adding water to said solution of resin, until phase inversion occurs, followed by adjusting the dilution to the desired solids content.

23. A cross-linkable aqueous composition of organic binder, comprising at least one resin as defined in claim 1.

24. The composition as claimed in claim 23, further comprising a cross-linking agent selected from primary and/or secondary polyamines with a functionality of at least 2.

* * * * *